(12) United States Patent
Casaburi et al.

(10) Patent No.: US 9,621,579 B2
(45) Date of Patent: Apr. 11, 2017

(54) SYSTEMS AND METHODS FOR PROTECTING AGAINST UNAUTHORIZED NETWORK INTRUSIONS

(71) Applicant: Symantec Corporation, Mountain View, CA (US)

(72) Inventors: Jim Casaburi, Rancho Palos Verdes, CA (US); Steven Stockman, Plattsmouth, NE (US)

(73) Assignee: Symantec Corporation, Mountain View, CA (US)

( * ) Notice: Subject to any disclaimer, the term of this patent is extended or adjusted under 35 U.S.C. 154(b) by 180 days.

(21) Appl. No.: 14/550,855

(22) Filed: Nov. 21, 2014

(65) Prior Publication Data

US 2016/0149930 A1 May 26, 2016

(51) Int. Cl.
*H04L 29/06* (2006.01)
*H04W 12/12* (2009.01)
*H04W 12/08* (2009.01)

(52) U.S. Cl.
CPC ........ *H04L 63/145* (2013.01); *H04L 63/1425* (2013.01); *H04L 63/20* (2013.01); *H04W 12/12* (2013.01); *H04W 12/08* (2013.01)

(58) Field of Classification Search
CPC .................................................. H04L 63/145
USPC ............................................................ 726/1
See application file for complete search history.

(56) References Cited

U.S. PATENT DOCUMENTS

2007/0025265 A1    2/2007  Porras et al.

2011/0080302 A1*  4/2011  Muthaiah ............... H04L 47/10
                                                              340/903
2013/0247194 A1    9/2013  Jha et al.

FOREIGN PATENT DOCUMENTS

GB    2508166    5/2014

OTHER PUBLICATIONS

"Wireless Intrusion Detection Software", http://www.whoisonmywifi.com/more-info/additional-info/monitoring-a-wireless-network/intrusion-detection-software/, as accessed Sep. 22, 2014, (Jan. 24, 2013).
"Wireless intrusion prevention system", http://en.wikipedia.org/wiki/Wireless_intrusion_prevention_system, as accessed Sep. 22, 2014, Wikipedia, (Jun. 7, 2008).
Waring, Becky "How to Secure Your Wireless Network", http://www.pcworld.com/article/130330/article.html, as accessed Sep. 22, 2014, PCWorld, (Apr. 9, 2007).

(Continued)

*Primary Examiner* — Jacob Lipman
(74) *Attorney, Agent, or Firm* — FisherBroyles LLP

(57) ABSTRACT

The disclosed computer-implemented method for protecting against unauthorized network intrusions may include (1) identifying a signal received by one or more antennas of a network from a transceiver of a device attempting to access the network, (2) detecting one or more signal strengths of the signal received by the antennas of the network in connection with the attempt to access the network, (3) determining, based at least in part on the signal strengths of the signal, that the attempt to access the network is potentially malicious, and then in response to determining that the attempt to access the network is potentially malicious, (4) initiating at least one security measure to address the potentially malicious attempt to access the network. Various other methods, systems, and computer-readable media are also disclosed.

16 Claims, 7 Drawing Sheets

(56) References Cited

OTHER PUBLICATIONS

Geier, Eric "5 Wi-Fi security myths you must abandon now", http://www.pcworld.com/article/2052158/5-wi-fi-security-myths-you-must-abandon-now.html, as accessed Sep. 22, 2014, PCWorld, (Oct. 7, 2013).
Lynn, Samara "Wireless Witch: How to Secure Your Wireless Network", http://www.pcmag.com/article2/0,2817,2420002,00.asp, as accessed Sep. 22, 2014, PCMag, (Jun. 6, 2013).
"Carrier signal", http://en.wikipedia.org/wiki/Carrier_signal, as accessed Sep. 22, 2014, Wikipedia, (Feb. 26, 2013).
"Antenna (radio)", http://en.wikipedia.org/wiki/Antenna_(radio), as accessed Sep. 22, 2014, Wikipedia, (Nov. 29, 2004).
Strickland, Jonathan "How to Secure Your Home Network", http://electronics.howstuffworks.com/how-to-tech/how-to-secure-home-network3.htm, as accessed Sep. 22, 2014, (Apr. 28, 2009).
Lockhart, Andrew "Hunting down wireless devices doing MAC spoofing", http://www.networkworld.com/article/2296641/network-security/hunting-down-wireless-devices-doing-mac-spoofing.html, as accessed Sep. 22, Network World, Inc., (Mar. 19, 2007).
Tao, Kai et al., "Detection of Spoofed MAC Addresses in 802.11 Wireless Networks", http://link.springer.com/chapter/10.1007%2F978-3-540-88653-2_15#190 page-1, as accessed Sep. 22, 2014, E-business and Telecommunications, Communications in Computer and Information Science, (2009), pp. 201-213, vol. 23.

\* cited by examiner

SYSTEMS AND METHODS FOR PROTECTING AGAINST UNAUTHORIZED NETWORK INTRUSIONS

BACKGROUND

Securing private networks is a critical problem facing organizations that range from families to governments. Such organizations may attempt to secure a private network using a variety of traditional methods. For example, an organization's administrator may authorize computers with certain Media Access Control (MAC) addresses and only permit computers with the authorized MAC addresses to access the network. As another example, an organization's administrator may protect a private network with a password and only permit computers that successfully input the correct password to access the network. Unfortunately, a user of an unauthorized computer may circumvent these traditional safeguards, for example, by illicitly cloning an authorized MAC address and/or by generating a large number of consecutive password guesses in an attempt to brute force the network's password. Accordingly, the instant disclosure identifies and addresses a need for additional and improved systems and methods for protecting against unauthorized network intrusions.

SUMMARY

As will be described in greater detail below, the instant disclosure describes various systems and methods for protecting against unauthorized network intrusions by identifying a signal from a device attempting to access a network and then determining whether the access attempt is malicious based at least in part on the identified signal. In one example, a computer-implemented method for protecting against unauthorized network intrusions may include (1) identifying a signal received by one or more antennas of a network from a transceiver of a device attempting to access the network, (2) detecting one or more signal strengths of the signal received by the antennas of the network in connection with the attempt to access the network, (3) determining, based at least in part on the signal strengths of the signal, that the attempt to access the network is potentially malicious, and then in response to determining that the attempt to access the network is potentially malicious, (4) initiating at least one security measure to address the potentially malicious attempt to access the network.

In one embodiment, the computer-implemented method may further include generating, based at least in part on the signal strengths of the signal received by the antennas of the network, a signal profile of the signal received by the antennas of the network. In some examples, determining that the attempt to access the network is potentially malicious may include (1) identifying a policy that specifies suspicious signal profiles that have been previously detected in connection with a threshold number of failed attempts to access the network, (2) determining that the signal profile matches at least one of the suspicious signal profiles specified in the policy, and then (3) determining that the attempt to access the network is potentially malicious due at least in part to the signal profile matching at least one of the suspicious signal profiles specified in the policy.

In one embodiment, detecting the one or more signal strengths of the signal received by the antennas of the network may include detecting, via a first antenna within the antennas of the network, a first strength of the identified signal and detecting, via at least one additional antenna within the antennas of the network, at least one additional strength of the identified signal. In this embodiment, generating the signal profile of the signal may include identifying, based at least in part on the signal profile, a variance between the first strength and the at least one additional strength of the received signal. Additionally or alternatively, determining that the attempt to access the network is potentially malicious may include (1) identifying a policy that specifies suspicious variances in signal strengths of signals received by the antennas of the network, (2) determining that the variance between the first strength and the at least one additional strength of the received signal matches at least one of the suspicious variances specified in the policy, and then (3) determining that the attempt to access the network is potentially malicious due at least in part to the variance between the first strength and the at least one additional strength matching at least one of the suspicious variances specified in the policy.

In some examples, determining that the attempt to access the network is potentially malicious may include determining that the signal profile matches an entry in a database of unauthorized signal profiles and/or the signal profile does not match an entry in a database of authorized signal profiles.

In some examples, determining that the attempt to access the network is potentially malicious may include (1) detecting a policy that blacklists one or more suspicious combinations of a signal profile and a MAC address, (2) determining that the signal profile and a MAC address of the device used in the attempt to access the network match at least one of the suspicious combinations blacklisted by the policy, and then (3) determining that the attempt to access the network is potentially malicious due at least in part to the signal profile and the MAC address of the device matching at least one of the suspicious combinations blacklisted by the policy.

In some examples, determining that the attempt to access the network is potentially malicious may include (1) determining that a MAC address of the device used in the attempt to access the network has been used in one or more previous successful attempts to access the network, (2) determining that the signal profile has not been previously used in connection with the MAC address during the previous successful attempts to access the network, and then (3) determining that the attempt to access the network is potentially malicious due at least in part to the MAC address having been used in the previous successful attempts and the signal profile having not been previously used in connection with the MAC address during the previous successful attempts.

In some examples, determining that the attempt to access the network is potentially malicious may include (1) determining that the signal profile has been detected in connection with previous access attempts that involved different MAC addresses and (2) then determining that the attempt to access the network is potentially malicious due at least in part to the signal profile having been detected in connection with the previous access attempts that involved the different MAC addresses.

In some examples, determining that the attempt to access the network is potentially malicious may include (1) identifying a MAC address of the device used in the attempt to access the network, (2) determining that an initiation time of the attempt to access the network is uncharacteristic of the MAC address, and then (3) determining that the attempt to access the network is potentially malicious due at least in part to the initiation time of the attempt to access the network being uncharacteristic of the MAC address.

In one embodiment, the computer-implemented method may further include (1) monitoring attempts to access one or more networks, (2) while monitoring the access attempts, identifying one or more signal profiles in connection with the monitored access attempts and identifying, based at least in part on the signal profiles, a set of attributes of the monitored access attempts, (3) building, from the set of attributes, a machine-learning based classification model for identifying malicious network access attempts, (4) using the machine-learning based classification model to create a policy for identifying potentially malicious access attempts, and then (5) determining that the attempt to access the network is potentially malicious based at least in part on the policy for identifying potentially malicious access attempts.

In some examples, monitoring the one of more access attempts may include (1) monitoring one or more attempts to access the network, (2) monitoring one or more attempts to access a network within a networks monitored by a security vendor, (3) monitoring one or more access attempts associated with a known MAC address, and/or (4) monitoring one or more access attempts associated with a known signal profile.

In some examples, the computer-implemented method may further include inputting at least one attribute of the attempt to access the network into the machine-learning based classification model. In some examples, initiating the security measure may include alerting a network administrator that the attempt to access the network is potentially malicious.

In one embodiment, the computer-implemented method may further include monitoring a response of the network administrator to the alert and adjusting, based at least in part on the response, a policy for identifying potentially malicious access attempts via a machine-learning based classification model. In some examples, initiating the security measure may include blocking the attempt to access the network and/or requiring the device to successfully complete an authorization process prior to accessing the network. In one embodiment, the identifying, detecting, determining, and initiating steps may be performed by an agent running on a router of the network.

In one embodiment, a system for implementing the above-described method may include (1) an identification module, stored in memory, that identifies a signal received by one or more antennas of a network from a transceiver of a device attempting to access the network, (2) a detection module, stored in memory, that detects one or more signal strengths of the signal received by the antennas of the network in connection with the attempt to access the network, (3) a determination module, stored in memory, that determines, based at least in part on the signal strengths of the signal, that the attempt to access the network is potentially malicious, (4) an initiation module, stored in memory, that initiates, in response to the determination that the attempt to access the network is potentially malicious, at least one security measure to address the potentially malicious attempt to access the network, and (5) at least one physical processor configured to execute the identification module, the detection module, the determination module, and the initiation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a signal received by one or more antennas of a network from a transceiver of a device attempting to access the network, (2) detect one or more signal strengths of the signal received by the antennas of the network in connection with the attempt to access the network, (3) determine, based at least in part on the signal strengths of the signal, that the attempt to access the network is potentially malicious, and (4) initiate, in response to the determination that the attempt to access the network is potentially malicious, at least one security measure to address the potentially malicious attempt to access the network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
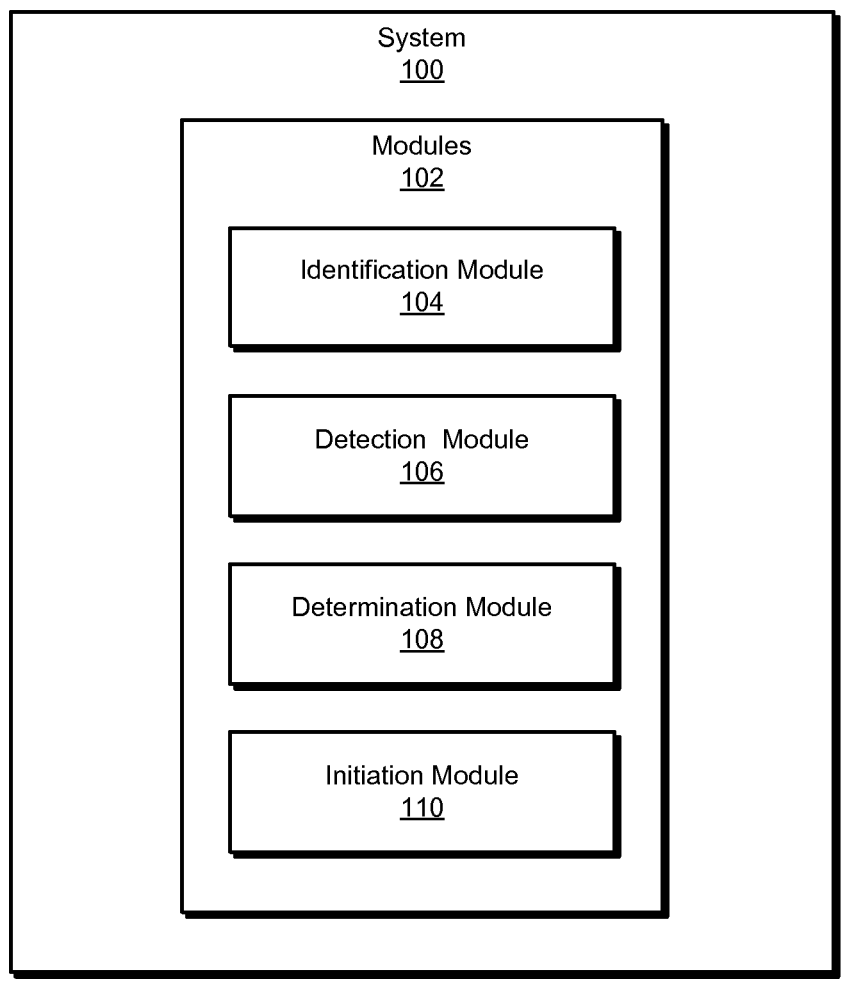
FIG. 1 is a block diagram of an exemplary system for protecting against unauthorized network intrusions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting against unauthorized network intrusions. As will be explained in greater detail below, by identifying potentially malicious attempts to access a network based on signals transmitted in connection with those access attempts, the systems and methods disclosed herein may identify malicious attempts that would have otherwise gone undetected. For example, the various systems and methods described herein may observe attempts to access a network, identify a subset of the attempts to access the network that were classified as malicious, extract a set of attributes from the subset of attempts that includes signals transmitted in connection with the malicious attempts, and then generate a policy based at least in part on the extracted set of attributes to use in identifying future malicious attempts to access the network.

Figure 2:
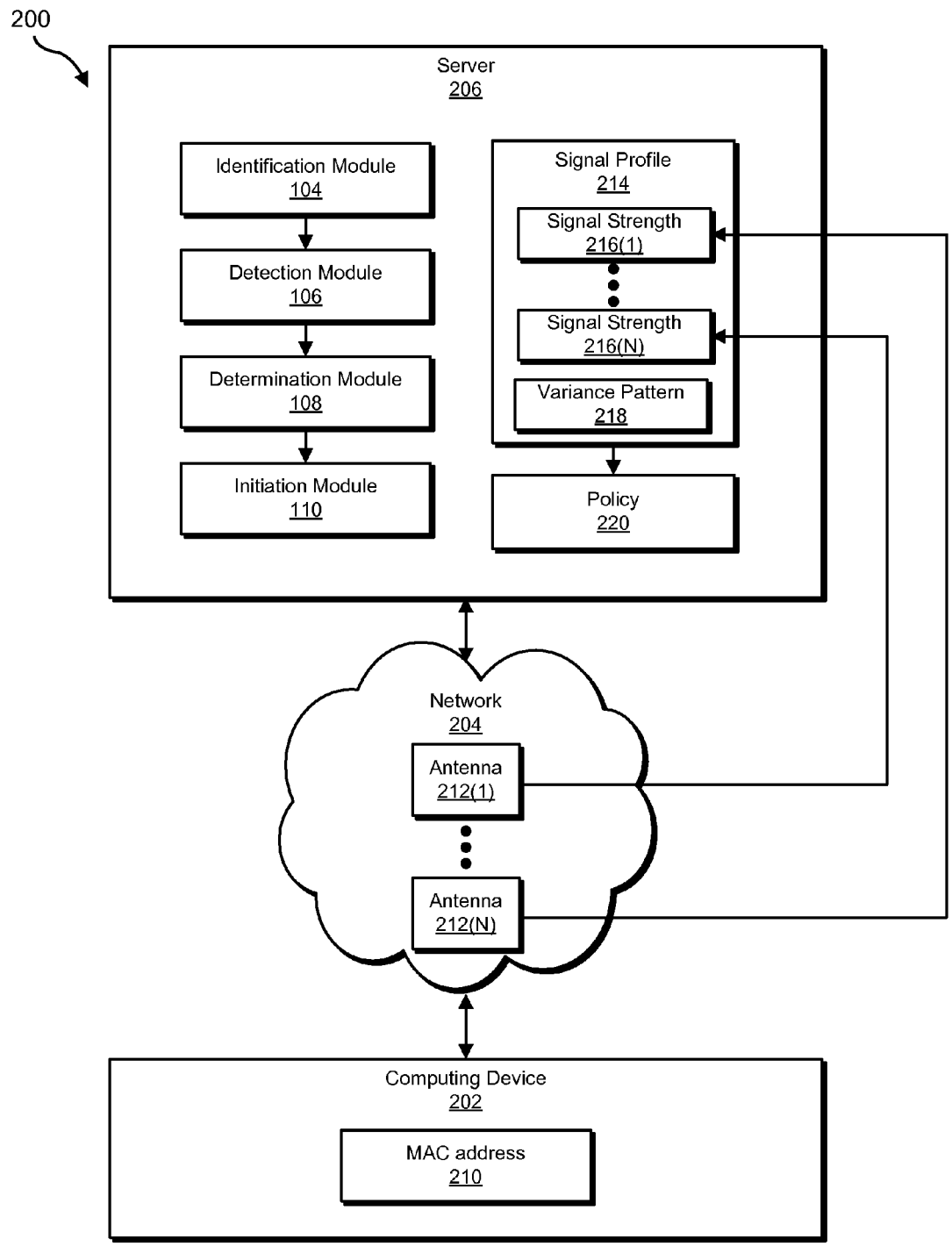
FIG. 2 is a block diagram of an additional exemplary system for protecting against unauthorized network intrusions.

The following will provide, with reference to FIGS. 1-2, detailed descriptions of exemplary systems for protecting against unauthorized network intrusions. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting against unauthorized network intrusions. As illustrated in this figure, exemplary system 100 may include one or more modules 102 for performing one or more tasks. For example, and as will be explained in greater detail below, exemplary system 100 may include an identification module 104 that identifies a signal received by one or more antennas of a network from a transceiver of a device attempting to access the network. Exemplary system 100 may additionally include a detection module 106 that detects one or more signal strengths of the signal received by the antennas of the network in connection with the attempt to access the network. Exemplary system 100 may also include a determination module 108 that determines, based at least in part on the signal strengths of the signal, that the attempt to access the network may be potentially malicious. Exemplary system 100 may additionally include an initiation module 110 that initiates at least one security measure to address the potentially malicious attempt to access the network in response to the determination that the attempt to access the network is potentially malicious.

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, network 204, and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, a server 206, and a network 204. Although illustrated as a separate entity in FIG. 2, server 206 may represent a portion of network 204. In one example, computing device 202 may be programmed with one or more of modules 102 and/or include MAC address 210. The term "media access control address" and the abbreviation "MAC address," as used herein, generally refer to an address assigned to a computing device connected to or attempting to connect to a network.

Additionally or alternatively, server 206 may be programmed with one or more of modules 102 and/or include a signal profile 214 and/or a policy 220. The term "signal profile," as used herein, generally refers to a data structure that delineates information about a specific signal. The term "signal," as used herein, generally refers to an electromagnetic waveform that carries information from a transceiver of a device. In some examples, a signal may refer to a radio wave. In these examples, the device attempting to access the network may create the signal by translating data into a radio wave and then transmitting the radio wave to one or more antennas of a network.

In one example, signal profile 214 may include and/or identify one or more signal strengths 216(1)-(N) received by antennas 212(1)-(N). Signal profile 214 may also include a strength score that is an aggregate of signal strengths 216(1)-(N). Additionally or alternatively, signal profile 214 may include and/or identify a variance pattern 218.

The term "signal strength," as used herein, generally refers to a strength of the signal received by an antenna. For example, signal strength 216(1) may be received by antenna 212(1) and represent a signal strength of 32 dBm. Additionally or alternatively, signal strength 216(N) may be received by an antenna 212(N) and represent a signal strength of 58 dBm. In some examples, signal strength 216(1) and signal strength 216(N) may have an aggregate strength score of (32 dBm+58 dBm)÷2=45 dBm.

The term "variance pattern," as used herein, generally refers to a difference in strength of a signal received at multiple antennas. For example, variance pattern 218 may include and/or identify the variance between signal strength 216(1) and signal strength 216(N). In this example, variance pattern 218 may represent a variance of (58 dBm−32 dBm)=26 dBm.

The term "policy," as used herein, generally refers to one or more guidelines, algorithms, and/or classifications that specify suspicious signal profiles. As used herein, the term "suspicious signal profile" generally refers to a signal profile resulting from a signal whose likelihood of being associated with a malicious attempt to access a network is above a certain threshold.

Additionally or alternatively, network 204 may be programmed with one or more of modules 102 and/or include one or more of antennas 212(1)-(N). The term "antenna," as used herein, generally refers to any rod, wire, and/or other electrical device used to transmit or receive signals. In some examples, antennas 212(1)-212(N) may form part of a clustered antenna environment. As used herein, the term "clustered antenna environment" generally refers to a plurality of antennas that are spatially separated within a geographic area and operate as part of the same network.

In one embodiment, one or more of modules 102 from FIG. 1 may, when executed by at least one processor of computing device 202, network 204, and/or server 206, enable computing device 202, network 204, and/or server 206 to protect against unauthorized network intrusions. For example, and as will be described in greater detail below, identification module 104 may identify a signal received by one or more antennas of network 204 from a transceiver of a device (such as computing device 202) attempting to access network 204 and/or server 206. Detection module 106 may detect one or more signal strengths of the signal (such as signal strengths 216(1)-216(N)) received by the antennas of network 204 in connection with the attempt to access network 204 and/or server 206. Detection module 106 may further generate a signal profile (such as signal profile 214) based at least in part on the one or more signal strengths. Determination module 108 may determine, based at least in part on the signal strengths of the signal, that the attempt to access network 204 and/or server 206 is potentially malicious. Initiation module 110 may initiate, in response to the determination that the attempt to access network 204 and/or server 206 is potentially malicious, at least one security measure to address the potentially malicious attempt to access network 204.

The at least one security measure may be directed at computing device 202. For example, initiation module 110 may block computing device 202 from accessing network 204 and/or server 206. Additionally or alternatively, the security measure may be directed at server 206. For example, initiation module 110 may send a notification to an administrator of server 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of protecting against unauthorized network intrusions. Examples of server 206 include, without limitation, network devices, switches, routers, gateways, application servers, and database servers configured to provide various network, switching, routing, or database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206. In some examples, network 204 may receive, at antennas 212(1)-212(N) of network 204, a signal from a transceiver of computing device 202. In some examples, network 204 may represent a private network, such as a wireless network managed residentially. Additionally or alternatively, network 204 may represent a network managed by a business or government.

Figure 3:
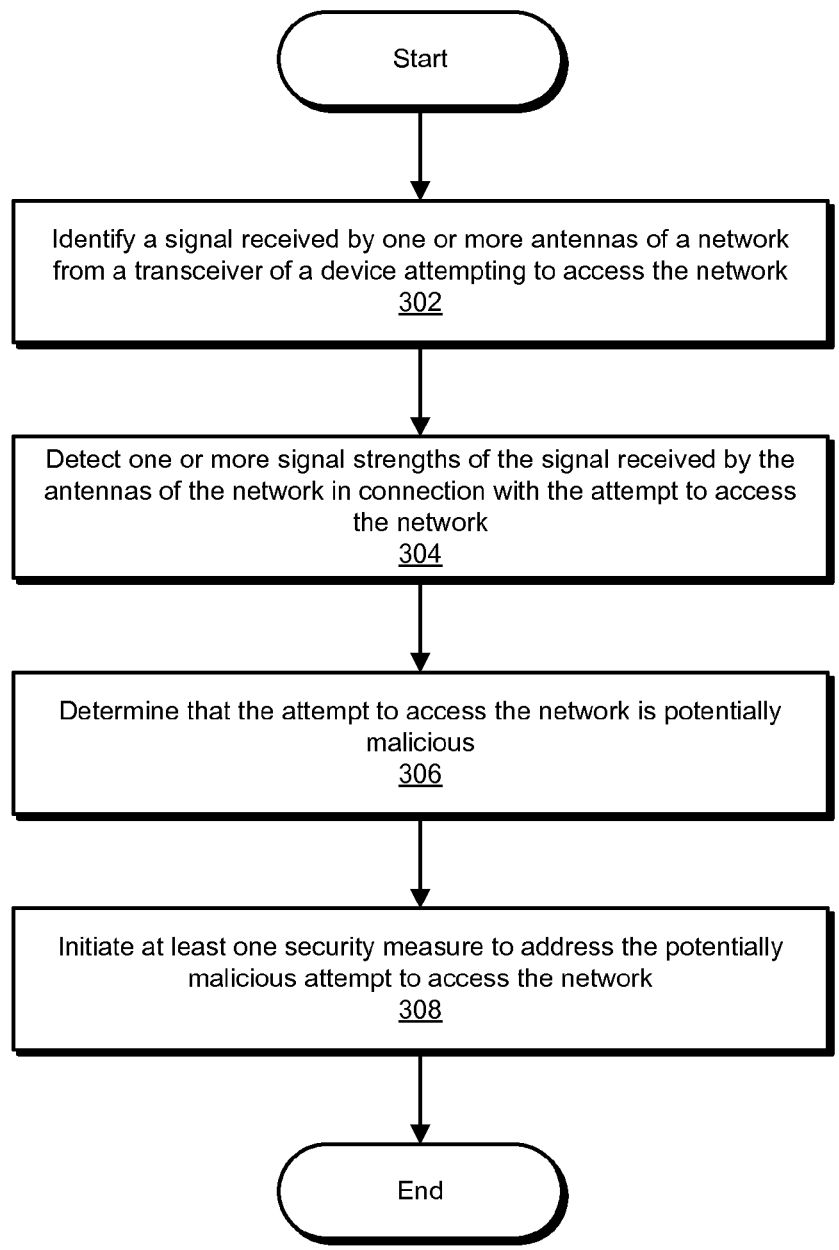
FIG. 3 is a flow diagram of an exemplary method for protecting against unauthorized network intrusions.

FIG. 3 is a flow diagram of an exemplary computer-implemented method 300 for protecting against unauthorized network intrusions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a signal received by one or more antennas of a network from a transceiver of a device attempting to access the network. For example, identification module 104 may, as part of server 206 and/or network 204 in FIG. 2, identify a signal received by antennas 212(1)-212(N) of network 204 from a transceiver of computing device 202 attempting to access network 204.

Identification module 104 may identify the signal received by the antennas of the network in a variety of ways. In some examples, identification module 104 may operate as part of network 204 and/or server 206 and identify the signal upon receiving the signal from antennas 212(1)-212(N). Additionally or alternatively, identification module 104 may operate as part of a third-party server (such as a security vendor server) and may identify the signal upon receiving the signal from antennas 212(1)-212(N) and/or network 204.

Returning to FIG. 3, at step 304, one or more of the systems described herein may detect one or more signal strengths of the signal received by the antennas of the network in connection with the attempt to access the network. For example, detection module 106 may, as part of server 206 and/or network 204 in FIG. 2, detect signal strengths 216(1)-216(N) of the signal received by antennas 212(1)-212(N) of network 204 in connection with the attempt by computing device 202 to access network 204.

Detection module 106 may detect the signal strengths of the signal received by the antennas in a variety of ways. In some examples, a single antenna of the network may receive the signal. For example, antenna 212(1) may receive signal strength 216(1). In these examples, detection module 106 may detect the strength of the signal via the single antenna. For example, signal strength 216(1) may represent a signal strength of 32 dBm. As antenna 212(1) receives the signal, detection module 106 may determine that the strength of the signal is 32dBm.

In other examples, two or more antennas within a clustered antenna environment of the network may receive the signal. For example, antennas 212(1)-(N) may receive signal strengths 216(1)-216(N). In these examples, each antenna within the clustered antenna environment may receive a different strength of the signal. For example, antenna 212(1) may receive signal strength 216(1) representing a signal strength of 32 dBm, and antenna 212(N) may receive signal strength 216(N) representing a signal strength of 58 dBm.

In some instances, the difference in the signal strength received by each antenna may be due at least in part to the relative proximity of the device to each antenna within the clustered antenna environment. In these instances, an antenna within the clustered antenna environment that is physically closest to the device may receive the strongest strength of the signal, and an antenna within clustered antenna environment that is physically farthest from the device may receive the weakest strength of the signal. For example, antenna 212(N) may be 10 feet from computing device 202, and antenna 212(1) may be 100 feet from computing device 202. As a result, antenna 212(N) may receive signal strength 216(N) that is 26 dBm stronger than signal strength 216(1) received by antenna 212(1).

As another example, the difference in the signal strength received by each antenna may be due at least in part to the direction in which the device is transmitting the signal. In many instances, the device may transmit the signal in all directions, and thus the signal may be omnidirectional. However, in other instances, the device may amplify the signal in one direction. In these instances, an antenna within the clustered antenna environment that is aimed toward the one direction may receive a signal strength that is significantly stronger than the signal strength received by antennas within the clustered antenna environment that are not aimed toward the one direction. Accordingly, the physical proximity of the device to the various antennas may have little or no effect on the signal strength of the signal received by the various antennas. Additionally or alternatively, the physical proximity of the device to the various antennas may not be the most significant factor in the strength of the received signal.

In the event that two or more antennas of the network receive the signal, detection module 106 may additionally detect a variance between the signal strengths received by each antenna within the clustered antenna environment. For example, detection module 106 may detect variance pattern 218 that delineates a variance between each of signal strengths 216(1)-216(N).

In some examples, detection module 106 may operate as part of network 204 and/or server 206 and detect signal strengths 216(1)-216(N) upon receiving the signal from antennas 212(1)-212(N). Additionally or alternatively, detection module 106 may operate as part of a third-party server (such as a security vendor server) and detect the signal strengths of the signal upon receiving the signal from the antennas 212(1)-212(N) and/or network 204.

In one embodiment, detection module 106 may also generate a signal profile of the signal based at least in part on the signal strengths of the signal received by the antennas of the network. For example, detection module 106 may generate signal profile 214 based at least in part on signal strengths 216(1)-216(N).

Returning to FIG. 3, at step 306, one or more of the systems described herein may determine, based at least in part on the signal strengths of the signal, that the attempt to access the network is potentially malicious. For example, determination module 108 may, as part of computing device 202 in FIG. 2, determine that the attempt to access network 204 is potentially malicious. In this example, the determination may be based at least in part on signal strengths 216(1)-216(N) of the signal.

As used herein, the term "potentially malicious attempt" generally refers to any type or form of access attempt having one or more characteristics that coincide with known malicious attempts to access a network. The phrase "malicious attempt to access a network," as used herein, generally refers to any type or form of access attempt that is unauthorized and/or configured to harm or infiltrate the network and/or devices associated with the network.

Determination module 108 may determine, based at least in part on the signal strengths of the signal, that the attempt to access the network is potentially malicious in a variety of ways. In some examples, determination module 108 may identify certain suspicious signal profiles specified in policy 220. In one example, policy 220 may indicate that certain signal profiles are suspicious when those signal profiles have been previously detected in connection with a threshold number of failed attempts to access network 204 and/or another network monitored by the same security service.

Determination module 108 may then determine that the generated signal profile matches the description of at least one of the suspicious signal profiles specified in the policy. For example, determination module 108 may determine that signal profile 214 has been detected previously in connection with a threshold number of failed attempts to access network 204 as specified in policy 220.

Finally, determination module 108 may determine that the attempt to access the network is potentially malicious due at least in part to the generated signal profile matching at least one of the suspicious signal profiles specified in the policy. For example, determination module 108 may determine that the attempt to access network 204 is potentially malicious due at least in part to signal profile 214 having been detected previously in connection with the threshold number of failed attempts to access network 204 as specified in policy 220.

In some embodiments, policy 220 may specify suspicious variances in the signal strengths of signals. In these embodiments, determination module 108 may determine that the attempt to access network 204 is potentially malicious by determining that variance pattern 218 matches at least one of the suspicious variances specified in policy 220. For example, the signal strength of a signal received at antenna 212(N) may typically be stronger than the signal strength of the same signal received at antenna 212(1). As a result, policy 220 may indicate that a variance is suspicious when the signal strength of the signal received at antenna 212(1) is stronger than the signal strength of the same signal received at antenna 212(N).

In this example, detection module 106 may detect signal strength 216(1) representing a 32 dBm signal strength of the signal received by antenna 212(1) and signal strength 216(N) representing a 58 dBm signal strength of the signal received by antenna 212(N). Detection module 106 may then generate signal profile 214 by identifying a variance pattern 218 and including variance pattern 218 in signal profile 214. In one example, variance pattern 218 may indicate that a variance of 26 dBm exists between signal strength 216(1) and signal strength 216(N) and/or signal strength 216(N) is stronger than signal strength 216(1).

Next, determination module 108 may determine that variance pattern 218 matches at least one of the suspicious variances specified in policy 220 based at least in part on signal strength 216(N) being stronger than signal strength 216(1). Finally, determination module 108 may determine that the attempt to access network 204 is potentially malicious due at least in part to variance pattern 218 matching at least one of the suspicious variances specified in policy 220.

In some examples, policy 220 may identify certain suspicious variance patterns that have been detected previously in connection with known malicious attempts to access a network. For example, determination module 108 may determine that malicious attempts to access a network sometimes involve directional amplification. Additionally or alternatively, determination module 108 may determine that a signal is likely sent using directional amplification when one network antenna receives a signal strength that is a certain amount stronger than the signal strengths of the signal received by all other network antennas. As a result, policy 220 may indicate that a variance pattern is suspicious when the signal strength received at one network antenna is that certain amount stronger than the signal strength received at all other network antennas.

In some embodiments, determination module 108 may determine that the attempt to access the network is potentially malicious by determining that the signal profile matches an entry in a database of unauthorized signal profiles. Additionally or alternatively, determination module 108 may determine that the attempt to access the network is potentially malicious by determining that the signal profile does not match any of the entries in a database of authorized signal profiles. In these embodiments, the database of unauthorized signal profiles may be a database of signal profiles that have previously been designated as unauthorized by a system administrator and/or a machine-learning classification system. Similarly, the database of authorized signal profiles may be a database of signal profiles that have previously been designated as authorized by a system administrator and/or a machine-learning classification system.

In some examples, policy 220 may blacklist one or more suspicious combinations of a signal profile and a MAC address. In these examples, determination module 108 may determine that the attempt to access network 204 is potentially malicious by determining that signal profile 214 and MAC address 210 match at least one of the suspicious combinations blacklisted by policy 220. Combinations blacklisted by policy 220 may include, without limitation, a MAC address that has been used more than a certain number of times in successful attempts to access the network and a signal profile that has been used less than a certain number of times in successful attempts to access the network, a MAC address that has been used less than a certain number of times in attempts to access the network and a signal profile that has been used in attempts to access the network at a certain rate, a MAC address that has been never been used in an attempt to access the network and a signal profile that has been used unsuccessfully more than a certain number of times in attempts to access the network, a MAC address that has been used in connection with more than a certain number of different signal profiles, variations of one or more of the same, combinations of one or more of the same, and/or any other suitable combinations.

In some embodiments, the determination module 108 may identify a device with a MAC address that is potentially a clone of an authorized MAC address and determine that the device with the potentially cloned MAC address is potentially malicious. As used herein, the phrase "clone of a MAC address" generally refers to a MAC address that is emulated in the software of a device but is not the actual MAC address of the device. For example, determination module 108 may determine that MAC address 210 has been used in one or more previous successful attempts to access network 204.

In some examples, MAC address 210 may be included in a whitelist maintained by an administrator of network 204. In these examples, the whitelist may identify certain MAC addresses that are permitted to access network 204. Determination module 108 may also determine that signal profile 214 was not used in connection with the one or more previous successful attempts. As a result of these determinations, determination module 108 may be able to determine that MAC address 210 has potentially been cloned for the attempt to access network 204 and/or the attempt to access network 204 is potentially malicious.

In some embodiments, the attempt to access network 204 may form part of a rapid succession of attempts to access network 204 with signal profile 214. As used herein, the phrase "rapid succession of attempts to access the network" generally refers to more than a threshold number of attempts to access the network initiated within a certain amount of time. The rapid succession of attempts to access the network may indicate that a user who is not authorized to access the network is attempting to access the network using brute force. In these embodiments, determination module 108 may determine that the attempts to access network 204 are associated with a threshold number of different MAC addresses. In response, determination module 108 may determine that the attempt to access network 204 is potentially malicious due at least in part to signal profile 214 having been detected in connection with the plurality of previous access attempts that involved the threshold number of different MAC addresses.

In some examples, determination module 108 may determine that the attempt to access the network is potentially malicious due at least in part to an initiation time of the attempt to access the network being uncharacteristic of the MAC address of the device. As used herein, an "uncharacteristic initiation time" generally refers to an initiation time that has never been associated with the MAC address of the device and/or has been associated with the MAC address of the device less than a threshold number of times. For example, determination module 108 may determine that MAC address 210 has previously been used in successful attempts to access network 204 and all of the previously successful attempts have occurred between 8 AM and 5 PM. In this example, determination module 108 may also determine that the attempt to access network 204 has occurred at 11 PM. As a result, determination module 108 may determine that the 11 PM initiation time is uncharacteristic of MAC address 210 the attempt to access network 204 is potentially malicious.

As discussed above in various embodiments, determination module 108 may determine that the attempt to access network 204 is potentially malicious based at least in part on policy 220. In some embodiments, policy 220 may specify suspicious characteristics of a signal profile. As used herein, the term "suspicious characteristics of a signal profile" generally refers to characteristics of a signal profile related to malicious attempts to access a network.

Figure 4:
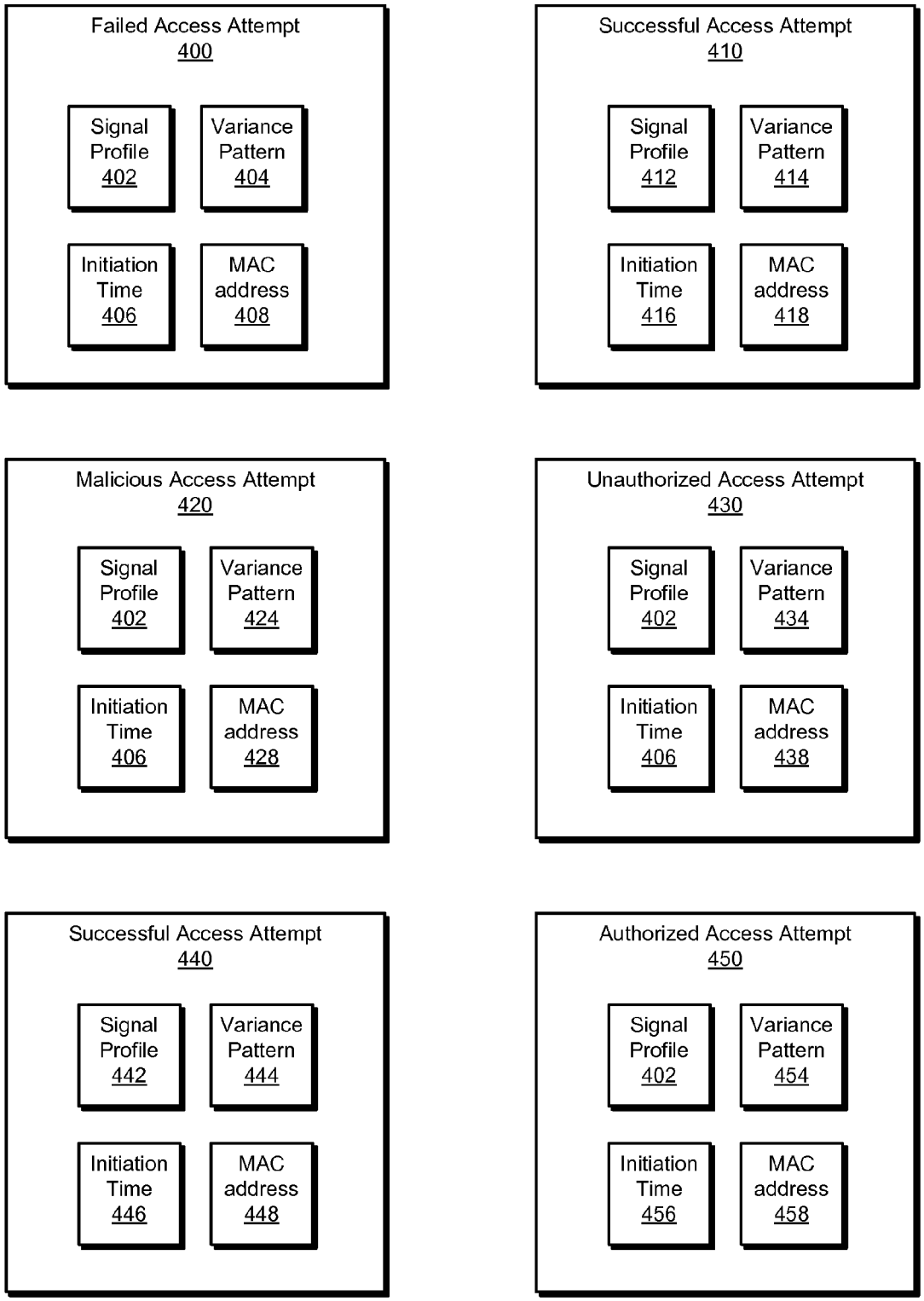
FIG. 4 is a block diagram that illustrates exemplary attributes of network access attempts that may be monitored.

Policy 220 may be created in a variety of ways. In some examples, the determination module 108 may create the policy by monitoring one or more attempts to access one or more networks. For example, as illustrated in FIG. 4, determination module 108 may monitor a failed access attempt 400 that attempted to access network 204 but was denied access. As part of monitoring failed access attempt 400, determination module 108 may identify a set of attributes of failed access attempt 400. For example, determination module 108 may identify a signal profile 402, a variance pattern 404, an initiation time 406, and a MAC address 408 of failed access attempt 400.

Additionally or alternatively, determination module 108 may monitor a successful access attempt 410 and/or a successful access attempt 440 that were permitted to access network 204. As part of monitoring successful access attempt 410 and/or successful access attempt 440, determination module 108 may identify a set of attributes of successful access attempt 410 and/or successful access attempt 440. For example, determination module 108 may identify a signal profile 412, a variance pattern 414, an initiation time 416, and a MAC address 418 of successful access attempt 410 and/or a signal profile 442, a variance pattern 444, an initiation time 446, and a MAC address 448 of successful access attempt 440.

Additionally or alternatively, determination module 108 may monitor a malicious access attempt 420 that was designated as malicious. As part of monitoring malicious access attempt 420, determination module 108 may identify a set of attributes of malicious access attempt 420. For example, determination module 108 may identify a signal profile 402, a variance pattern 424, an initiation time 406, and a MAC address 428 of malicious access attempt 420.

Additionally or alternatively, determination module 108 may monitor an unauthorized access attempt 430 that was designated as unauthorized to access network 204. As part of monitoring unauthorized access attempt 430, determination module 108 may identify a set of attributes of unauthorized access attempt 430. For example, determination module 108 may identify a signal profile 402, a variance pattern 434, an initiation time 406, and a MAC address 438 of unauthorized access attempt 430.

Additionally or alternatively, determination module 108 may monitor an authorized access attempt 450 that was designated as authorized to access network 204. As part of monitoring authorized access attempt 450, determination module 108 may identify a set of attributes of authorized access attempt 450. For example, determination module 108 may identify a signal profile 402, a variance pattern 454, an initiation time 456, and a MAC address 458 of authorized access attempt 450.

In some examples, monitoring the one or more access attempts may include monitoring one or more attempts to access network 204. Additionally or alternatively, monitoring the one or more access attempts may include monitoring one or more attempts to access a network within a plurality of networks monitored by a single security vendor. Additionally or alternatively, monitoring the one or more access attempts may include monitoring one or more access attempts associated with a known MAC address. Additionally or alternatively, monitoring the one or more access attempts may include monitoring one or more access attempts associated with a known signal profile.

In some embodiments, determination module 108 may build, from the identified set of attributes illustrated in FIG. 4, a machine-learning based classification model for identifying malicious network access attempts and use the machine-learning based classification model to create a policy for identifying potentially malicious access attempts, such as policy 220, policy 500, and/or policy 520.

For example, the machine-learning based classification model may indicate that signal profile 402 is suspicious based at least in part on the association between signal profile 402 and access attempts that either failed or were categorized as malicious (e.g., failed access attempt 400, malicious access attempt 420, and unauthorized access attempt 430). In response, determination module 108 may specify that signal profile 402 is suspicious. Similarly, the machine-learning based classification model may indicate that signal profile 402 combined with initiation time 406 is suspicious because such a combination is associated with access attempts that are failed, malicious, and/or unauthorized (such as failed access attempt 400, malicious access attempt 420, and/or unauthorized access attempt 430). In response, determination module 108 may specify that signal profile 402 combined with initiation time 406 is a suspicious combination. Additionally or alternatively, the machine-learning based classification model may indicate that signal profile 402 combined with initiation time 456 is not suspicious because such a combination is associated with access attempts that have been authorized (such as authorized access attempt 450).

Figure 5:
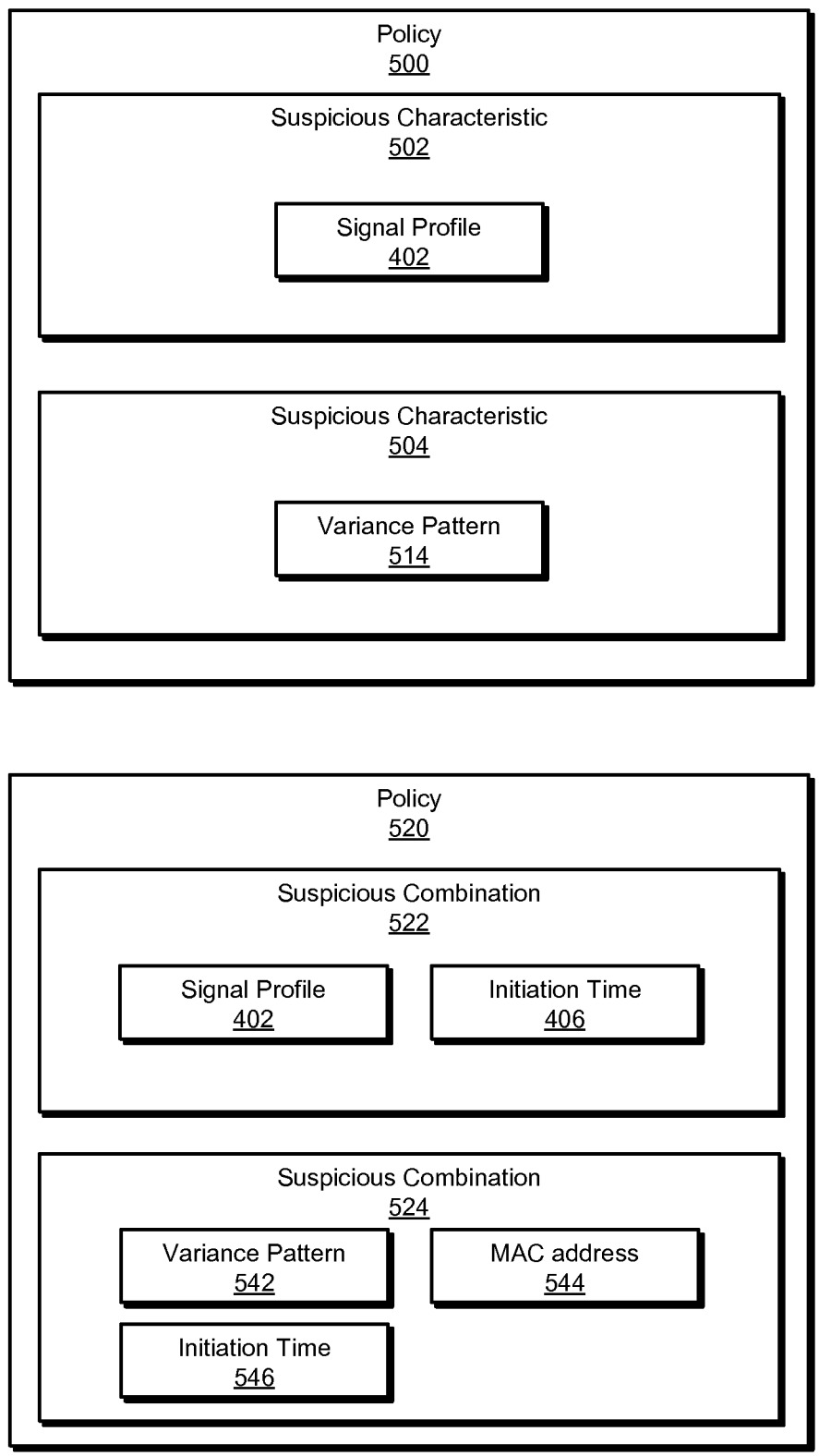
FIG. 5 is a block diagram of exemplary policies for protecting against unauthorized network intrusions.

In some embodiments, as illustrated in FIG. 5, a policy 500 used by network 204 may specify, based at least in part on the monitoring described above, that a signal profile 402 and/or a variance pattern 514 are suspicious (e.g., suspicious characteristic 502 and suspicious characteristic 504, respectively). In this example, determination module 108 may determine that the attempt to access network 204 is malicious based at least in part on signal profile 214 corresponding to signal profile 402 and/or variance pattern 218 corresponding to variance pattern 514.

Similarly, a policy 520 used by network 204 may specify, based on the monitoring described above, that signal profile 402 and initiation time 406 are a suspicious combination and/or that variance pattern 542, MAC address 544, and initiation time 546 are a suspicious combination (e.g., suspicious combination 522 and suspicious combination 524, respectively). In these examples, determination module 108 may determine that the attempt to access network 204 is malicious based at least in part on signal profile 214 corresponding to signal profile 402 and the attempt to access network 204 occurring at initiation time 406. Additionally or alternatively, determination module 108 may determine that the attempt to access network 204 is malicious based at least in part on variance pattern 218 corresponding to variance pattern 542, MAC address 210 corresponding to MAC address 544, and/or the attempt to access network 204 occurring at initiation time 546.

In some examples, determination module 108 may input at least one attribute of the attempt to access network 204 into the machine-learning based classification model. The phrase "machine-learning based classification model," as used herein, generally refers to a complex mathematical model for data classification that is generated using machine-learning techniques. In some examples, a module operating as part of network 204 and/or server 206 may create the policy. Additionally or alternatively, a module operating as part of a third party security vendor server may create the policy.

At step 308, one or more of the systems described herein may initiate, in response to the determination that the attempt to access the network is potentially malicious, at least one security measure to address the potentially malicious attempt to access the network. For example, initiation module 110 may, as part of server 206 and/or network 204 in FIG. 2, initiate at least one security measure to address the potentially malicious attempt to access network 204. In this example, the security measure may be initiated in response to the determination that the attempt to access network 204 is potentially malicious.

Initiation module 110 may initiate the security measure in a variety of ways. In some examples, initiation module 110 may initiate the security measure by alerting a network administrator that the attempt to access the network is potentially malicious. In these examples, initiation module 110 may monitor a response of the network administrator to the alert and adjust policy 220 to facilitate identifying potentially malicious access attempts based at least in part on the response. Additionally or alternatively, initiation module 110 may initiate the security measure by blocking the attempt to access network 204 and/or requiring the device to successfully complete an authorization process prior to accessing network 204.

As described above, the instant disclosure describes various systems and methods for protecting against unauthorized network intrusions by identifying a signal from a device attempting to access a network and then determining whether the attempt is malicious based at least in part on the signal. By basing the identification of a malicious attempt to access a network on a signal used in connection with the attempt to access the network, the systems and methods disclosed herein may identify malicious attempts that would have gone otherwise undetected.

Figure 6:
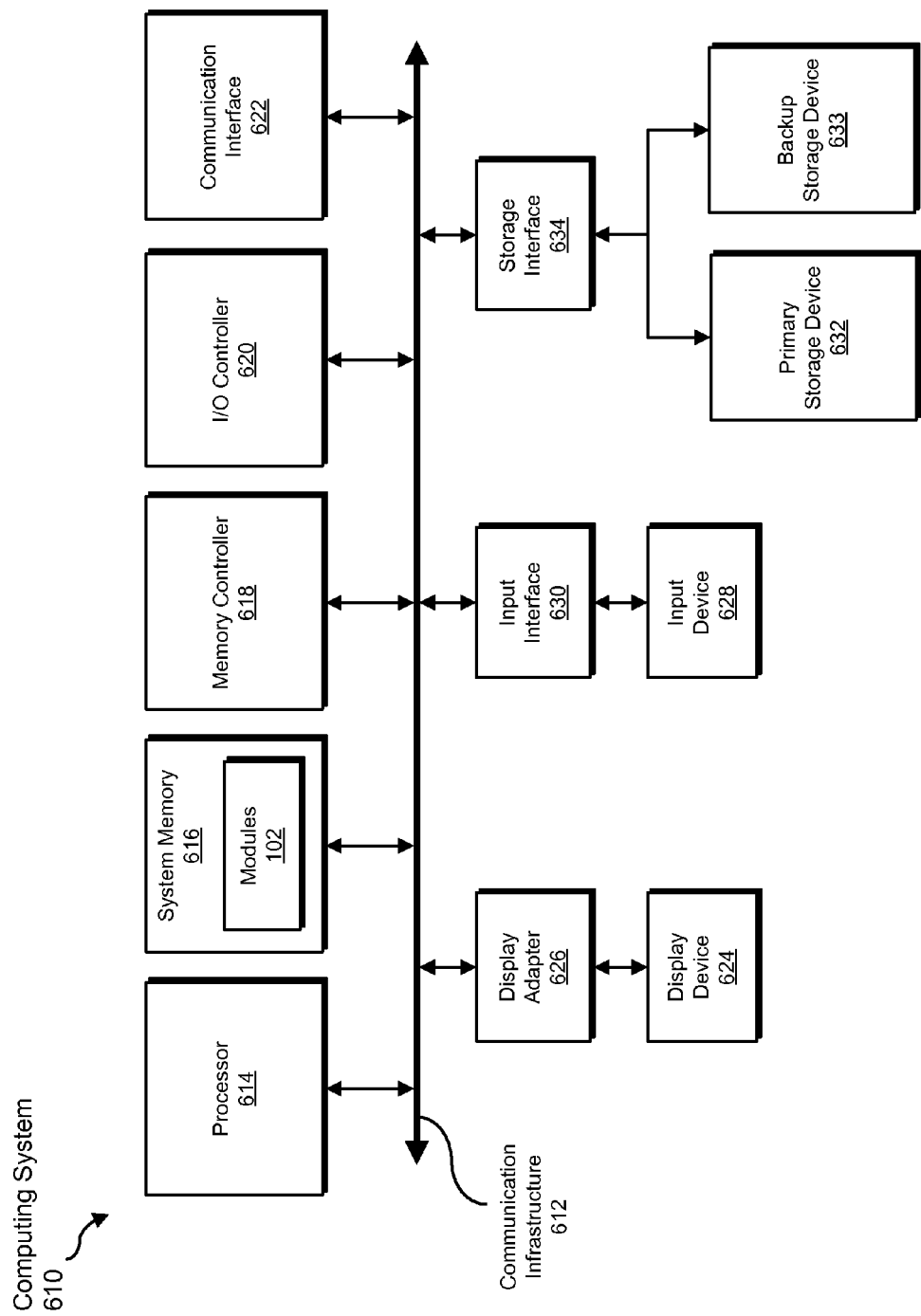
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
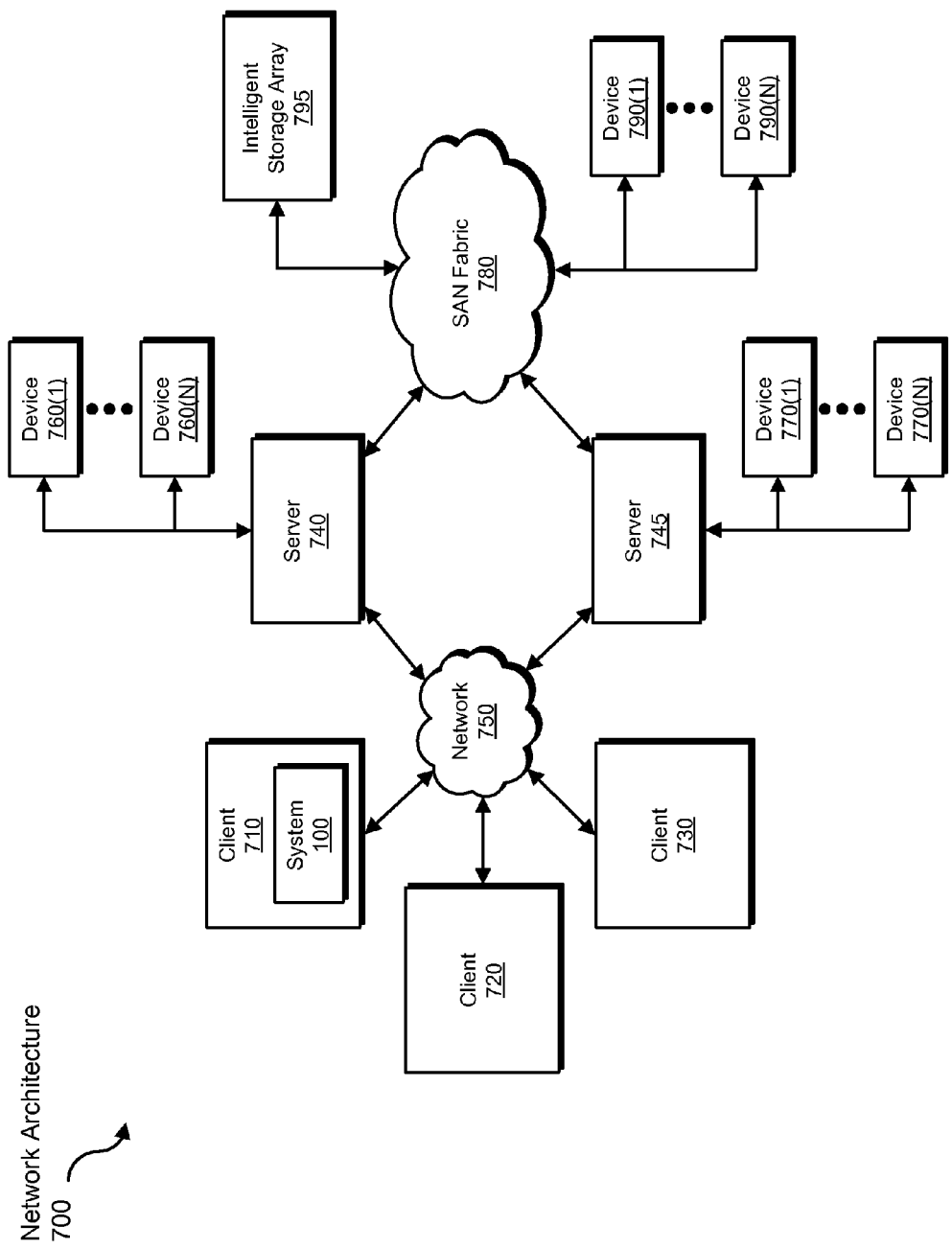
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting against unauthorized network intrusions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a signal into access attempt security determination. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against unauthorized network intrusions, at least a portion of the method being performed by a computing device comprising at least one processor, the method comprising:
    identifying a signal received by one or more antennas of a network from a transceiver of a device attempting to access the network;
    detecting one or more signal strengths of the signal received by the antennas of the network in connection with the attempt to access the network;
    generating, based at least in part on the signal strengths of the signal received by the antennas of the network, a signal profile of the signal received by the antennas of the network, wherein the signal profile of the signal comprises a data structure that delineates information about the signal as an electromagnetic waveform that carries information from the transceiver of the device attempting to access the network;
    determining that the attempt to access the network is potentially malicious by:
        identifying a policy that specifies suspicious signal profiles that have been previously detected in connection with a threshold number of failed attempts to access the network; and
        determining that the signal profile matches at least one of the suspicious signal profiles specified in the policy; and
    in response to determining that the attempt to access the network is potentially malicious, initiating at least one security measure to address the potentially malicious attempt to access the network.

2. The computer-implemented method of claim 1, wherein:
    detecting the one or more signal strengths of the signal received by the antennas of the network comprises:
        detecting, via a first antenna within the antennas of the network, a first strength of the identified signal; and
        detecting, via at least one additional antenna within the antennas of the network, at least one additional strength of the identified signal;
    generating the signal profile of the signal comprises identifying, based at least in part on the signal profile, a variance between the first strength and the at least one additional strength of the received signal; and
    determining that the attempt to access the network is potentially malicious comprises:
        identifying a policy that specifies suspicious variances in signal strengths of signals received by the antennas of the network;
        determining that the variance between the first strength and the at least one additional strength of the received signal matches at least one of the suspicious variances specified in the policy; and
        determining that the attempt to access the network is potentially malicious due at least in part to the variance between the first strength and the at least one additional strength matching the at least one of the suspicious variances specified in the policy.

3. The computer-implemented method of claim 1, wherein determining that the attempt to access the network is potentially malicious comprising determining that at least one of:
    the signal profile matches an entry in a database of unauthorized signal profiles; and
    the signal profile does not match an entry in a database of authorized signal profiles.

4. The computer-implemented method of claim 1, wherein determining that the attempt to access the network is potentially malicious comprises:
    detecting a policy that blacklists one or more suspicious combinations of a signal profile and a Media Access Control (MAC) address;
    determining that the signal profile and a MAC address of the device used in the attempt to access the network match at least one of the suspicious combinations blacklisted by the policy; and
    determining that the attempt to access the network is potentially malicious due at least in part to the signal profile and the MAC address of the device matching the at least one of the suspicious combinations blacklisted by the policy.

5. The computer-implemented method of claim 1, wherein determining that the attempt to access the network is potentially malicious comprises:
    determining that a MAC address of the device used in the attempt to access the network has been used in one or more previous successful attempts to access the network;
    determining that the signal profile has not been previously used in connection with the MAC address during the previous successful attempts to access the network; and
    determining that the attempt to access the network is potentially malicious due at least in part to the MAC address having been used in the previous successful attempts and the signal profile having not been previously used in connection with the MAC address during the previous successful attempts.

6. The computer-implemented method of claim 1, wherein determining that the attempt to access the network is potentially malicious comprises:
- determining that the signal profile has been detected in connection with a plurality of previous access attempts that involved a plurality of different MAC addresses; and
- determining that the attempt to access the network is potentially malicious due at least in part to the signal profile having been detected in connection with the plurality of previous access attempts that involved the plurality of different MAC addresses.

7. The computer-implemented method of claim 1, wherein determining that the attempt to access the network is potentially malicious comprises:
- identifying a MAC address of the device used in the attempt to access the network;
- determining that an initiation time of the attempt to access the network is uncharacteristic of the MAC address; and
- determining that the attempt to access the network is potentially malicious due at least in part to the initiation time of the attempt to access the network being uncharacteristic of the MAC address.

8. The computer-implemented method of claim 1, wherein initiating the security measure comprises at least one of:
- blocking the attempt to access the network; and
- requiring the device to successfully complete an authorization process prior to accessing the network.

9. The computer-implemented method of claim 1, wherein the identifying, detecting, determining, and initiating steps are performed by an agent running on a router of the network.

10. The computer-implemented method of claim 1, wherein initiating the security measure comprises alerting a network administrator that the attempt to access the network is potentially malicious.

11. The computer-implemented method of claim 10, further comprising:
- monitoring a response of the network administrator to the alert; and
- adjusting, based at least in part on the response, a policy for identifying potentially malicious access attempts via a machine-learning based classification model.

12. The computer-implemented method of claim 1, further comprising:
- monitoring one or more attempts to access one or more networks;
- while monitoring the access attempts:
  - identifying one or more signal profiles in connection with the monitored access attempts; and
  - identifying, based at least in part on the signal profiles, a set of attributes of the monitored access attempts;
- building, from the set of attributes, a machine-learning based classification model for identifying malicious network access attempts;
- using the machine-learning based classification model to create a policy for identifying potentially malicious access attempts; and
- determining that the attempt to access the network is potentially malicious based at least in part on the policy for identifying potentially malicious access attempts.

13. The computer-implemented method of claim 12, wherein monitoring the one or more access attempts comprises at least one of:
- monitoring one or more attempts to access the network;
- monitoring one or more attempts to access a network within a plurality of networks monitored by a security vendor;
- monitoring one or more access attempts associated with a known MAC address; and
- monitoring one or more access attempts associated with a known signal profile.

14. The computer-implemented method of claim 12, further comprising inputting at least one attribute of the attempt to access the network into the machine-learning based classification model.

15. A system for protecting against unauthorized network intrusions, the system comprising:
- an identification module, stored in memory, that identifies a signal received by one or more antennas of a network from a transceiver of a device attempting to access the network;
- a detection module, stored in memory, that:
  - detects one or more signal strengths of the signal received by the antennas of the network in connection with the attempt to access the network; and
  - generates, based at least in part on the signal strengths of the signal received by the antennas of the network, a signal profile of the signal received by the antennas of the network, wherein the signal profile of the signal comprises a data structure that delineates information about the signal as an electromagnetic waveform that carries information from the transceiver of the device attempting to access the network;
- a determination module, stored in memory, that determines that the attempt to access the network is potentially malicious by:
  - identifying a policy that specifies suspicious signal profiles that have been previously detected in connection with a threshold number of failed attempts to access the network; and
  - determining that the signal profile matches at least one of the suspicious signal profiles specified in the policy;
- an initiation module, stored in memory, that initiates, in response to the determination that the attempt to access the network is potentially malicious, at least one security measure to address the potentially malicious attempt to access the network; and
- at least one physical processor configured to execute the identification module, the detection module, the determination module, and the initiation module.

16. A non-transitory computer-readable medium comprising one or more computer-readable instructions that, when executed by at least one processor of a computing device, cause the computing device to:
- identify a signal received by one or more antennas of a network from a transceiver of a device attempting to access the network;
- detect one or more signal strengths of the signal received by the antennas of the network in connection with the attempt to access the network;
- generate, based at least in part on the signal strengths of the signal received by the antennas of the network, a signal profile of the signal received by the antennas of the network, wherein the signal profile of the signal comprises a data structure that delineates information about the signal as an electromagnetic waveform that carries information from the transceiver of the device attempting to access the network;

determine that the attempt to access the network is potentially malicious by:
  identifying a policy that specifies suspicious signal profiles that have been previously detected in connection with a threshold number of failed attempts to access the network; and
  determining that the signal profile matches at least one of the suspicious signal profiles specified in the policy; and
initiate, in response to the determination that the attempt to access the network is potentially malicious, at least one security measure to address the potentially malicious attempt to access the network.

* * * * *